United States Patent [19]

Manfredi

[11] 4,113,208
[45] Sep. 12, 1978

[54] AIRCHUTE EJECTION

[76] Inventor: Dario John Manfredi, 45-38 48th St., Woodside, N.Y. 11377

[21] Appl. No.: 739,709

[22] Filed: Nov. 8, 1976

[51] Int. Cl.$^2$ ............................................. B64D 17/70
[52] U.S. Cl. .................................... 244/139; 244/147
[58] Field of Search ............... 244/139, 140, 141, 147, 244/148

[56] References Cited

U.S. PATENT DOCUMENTS

| | | | |
|---|---|---|---|
| 1,192,480 | 7/1916 | Van Meter, Jr. | 244/147 |
| 1,277,892 | 9/1918 | Evans | 244/147 |
| 1,823,758 | 9/1931 | Owens | 244/139 |
| 2,032,824 | 3/1936 | Adams | 244/147 |
| 2,050,324 | 8/1936 | Hoffman | 244/140 |
| 2,392,448 | 1/1946 | Atherton | 244/139 |

FOREIGN PATENT DOCUMENTS 627,502  3/1936  Fed. Rep. of Germany ........... 244/147

*Primary Examiner*—Galen L. Barefoot
*Attorney, Agent, or Firm*—Peck & Peck

[57] ABSTRACT

This invention relates to an arrangement providing the safe descent to the ground of the fuselage of an aircraft when it has been disabled. The pilot of the aircraft when it is disabled actuates any suitable control mechanism on the dash panel to automatically release a parachute, the cables depending therefrom being affixed to the center of gravity of the aircraft for the safe descent thereof under the action of the parachute. The parachute is stored within a cradle or the like housing which is maintained in inoperative position within a storage well provided in the fuselage and this storage well is closed by a releasable closure member to which the cradle is affixed. When the pilot of the aircraft actuates the mechanism on the dash panel, the closure member for the storage well may open, and along with the cradle containing the parachute, swings upwardly to operative position and this operative position from which the parachute is ejected from the cradle is positioned above the horizontal plane of the topmost portion of the tail assembly of the aircraft. Additional mechanism is also provided for ejecting the cradle out of the storage well and into this uppermost operative position. Automatic mechanism is associated with the closure member and is operable upon the opening thereof to actuate additional mechanism for ejecting the parachute from the cradle.

1 Claim, 5 Drawing Figures

AIRCHUTE EJECTION

SUMMARY OF THE INVENTION

This invention relates to means under the control of the pilot of an aircraft for the safe descent of the fuselage thereof in the event that an emergency occurs in which the aircraft is inoperable. This safe descent of the fuselage of the aircraft is accomplished by means of a parachute or canopy which is stored within a well provided in the fuselage and means are provided for automatically releasing the canopy. The canopy is attached to the fuselage of the aircraft at the center of gravity thereof.

The canopy or parachute is housed within a cradle which is mounted within the well in the fuselage and such well is closed by a door or closure member to which the cradle is fixed, the closure being automatically unlatched upon actuation of a button or the like by the pilot of the aircraft, and means is provided which is simultaneously operable with the unlatching of the closure to push the closure and the cradle upwardly upon hinges into operative canopy releasing position. When the door and its attached cradle are in their fully operative open position, the cradle is above the horizontal plane of the tail assembly of the aircraft so that upon release of the canopy it will not become entangled with the tail assembly.

Further automatically operable means is provided which actuates mechanism to push the cradle contained canopy from the cradle when the closure member is in fully opened position, thereby releasing the canopy which is attached to the center of gravity of the fuselage, thereby allowing the safe vertical descent of the fuselage.

It is to be appreciated that when the pilot of the aircraft causes actuation of the various means which have been generally described above, the wings of the aircraft which may contain the fuel tanks, the engine units, etc., are also automatically released from the fuselage for dropping to the ground. An arrangement for accomplishing this is shown and described in my U.S. Pat. No. 2,665,093.

Additional objects and advantages of the present invention will become more readily apparent to those skilled in the art when the following general statements and descriptions are read in the light of the appended drawings.

DETAILED DESCRIPTION OF THE INVENTION

Figure 1:
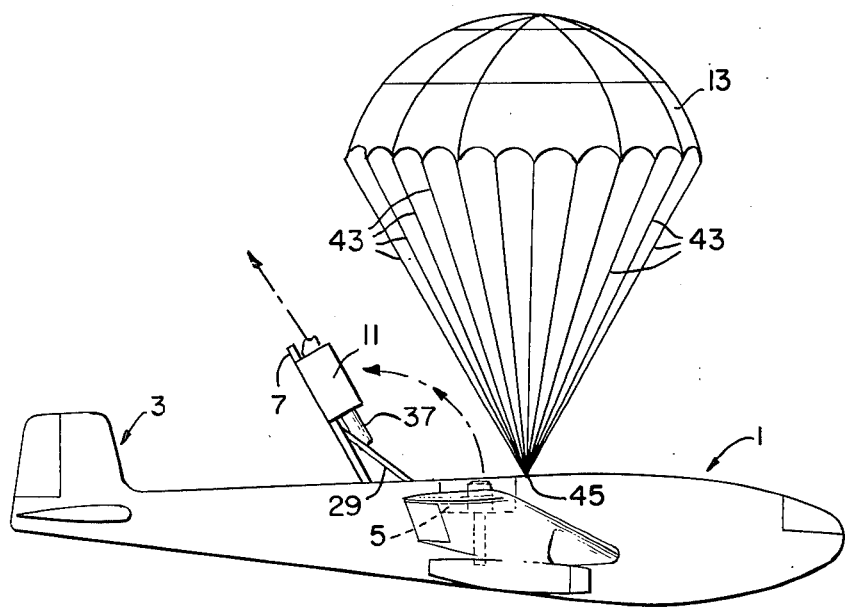
FIG. 1 is a view in elevation of the fuselage of the aircraft with the canopy open for the safe descent thereof to the ground.

In the accompanying drawings, I have used the numeral 1 to designate, in its entirety, the fuselage of an aircraft and the numeral 3 to designate, in its entirety, the tail assembly of the aircraft. A well 5 is provided in the fuselage of the aircraft and an openable closure member or trap door 7 for closing this well is provided and is hinged as at 9 in any suitable manner to the fuselage of the aircraft. A cradle or storage means 11 for a canopy is fixed, in any suitable manner, to the under side of the closure member 7. A canopy or parachute 13 is stored within the cradle 11 for release therefrom in a manner to be hereinafter described in detail.

When the pilot of the aircraft actuates a button or the like, any suitable or apt type latch means 15 for the closure member 7 is operated to release the closure for its upwardly swinging movement on the hinges 9. The latch means 15 is preferably actuated by electrical means and the wires therefore are shown at 17. I provide a boosting plate or platform 19 which is fixed on a piston 21 operable in a cylinder 23 which is forced upwardly by means of a charge which is disposed in the lower part of the cylinder 23 and is ignited by means of electrical cables 25 providing an electrical spark means when the latch 15 is operated to release the closure member 7 from its position closing the well 5. It is to be understood that the ignition operates on the charge simultaneously with the release of the latch means 15. If desired, a tension spring 27 encircles the piston and may be fixed to the cylinder.

Figure 2:
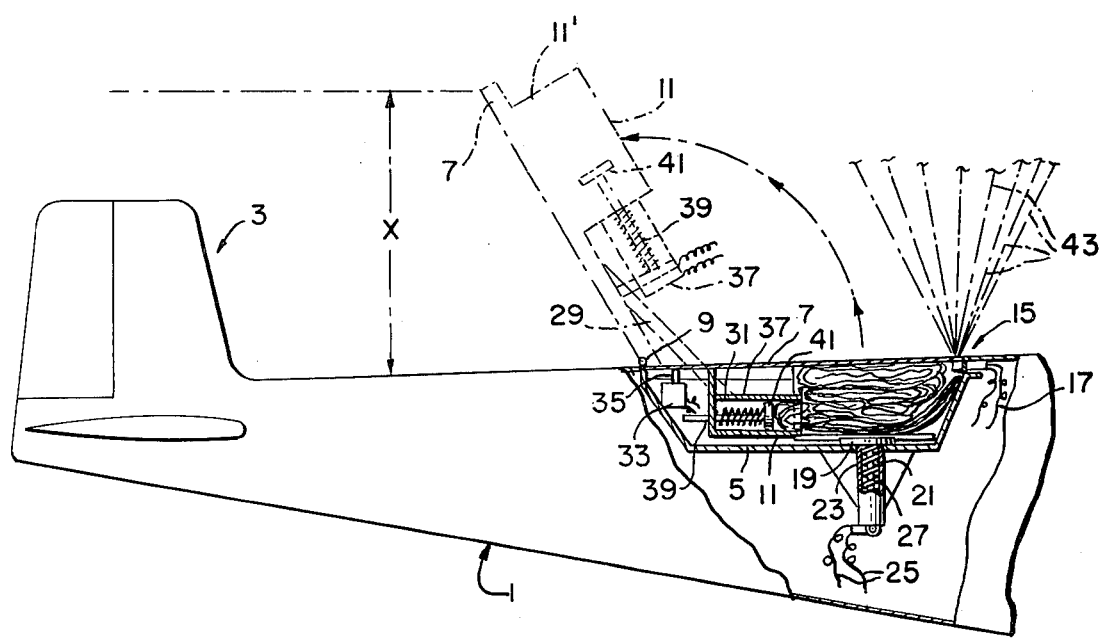
FIG. 2 is a sectional view illustrating in particular the cradle for the canopy and the various operating mechanisms therefore.
Figure 3:
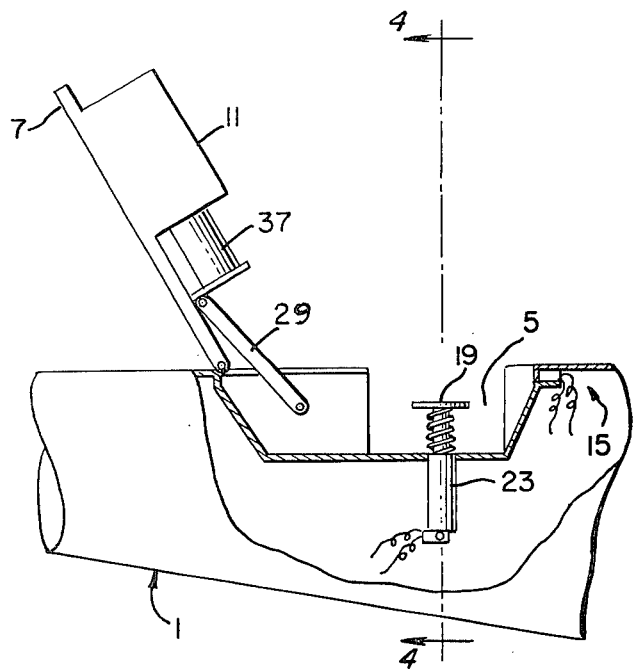
FIG. 3 is a detailed sectional view of the canopy cradle in open canopy releasing position.
Figure 4:
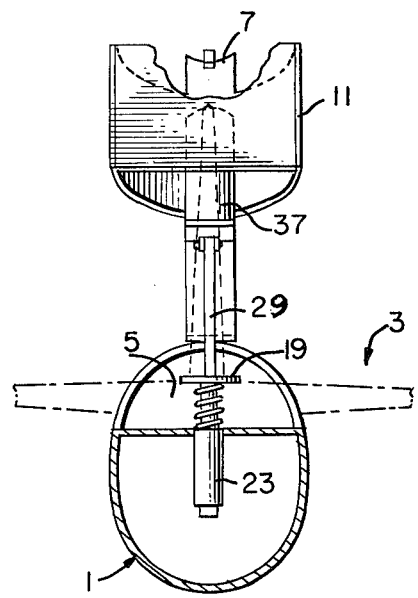
FIG. 4 is a view taken on the line 4—4 of FIG. 3.

When this simultaneous actuation of the latch means 15 and the ignition of the charge, the booster platform 19 which is mounted on the piston is forced upwardly against the bottom of the cradle 11 thereby forcing the closure member 7 upwardly on its hinges and then being in the airstream it moves upwardly to the position illustrated in phantom lines in FIG. 2 and also illustrated in full lines in FIG. 1. It is to be understood that when the closure member 7 along with the cradle 11 is forced upwardly by the platform 19, it will enter the airstream to ensure movement thereof to operative canopy releasing position as clearly illustrated in the drawings. A guide or reinforcing arm 29 is fixed to the closure member 7 and is pivoted as at 31 to the vertical sides of the well.

When the closure member 7 and the cradle with the canopy stored therein is in fully open position, as illustrated in FIG. 1 and in phantom lines in FIG. 2, it will be clear that the upper open end 11' of the cradle is in a horizontal plane above the tail assembly 3 so that when the canopy is ejected from and through the open end of the cradle it will be positioned above the tail assembly to thereby eliminate the possibility of its entanglement with the tail assembly.

An electric switch 33 is mounted within the well 5 and is provided with an actuating plunger 35 which in inoperative position is in engagement with the closure member 7 and in this position the switch remains open. When the closure member 7 opens, the plunger 35 is free to move upwardly and to close the switch 33 for a purpose which will be hereinafter described.

Upon the opening of the closure member 7, the switch 33 which is in electrical connection with a charge in the cylinder 37 is closed and the charge is ignited to move the piston 39 upwardly in the cylinder. On the outer end of the piston 39 is a boosting plate or platform 41 which, when the charge is ignited moves upwardly through the lower open end of the cradle and into the cradle 11 to push the canopy 13 out of the cradle and into the airstream so that it may control the vertical descent of the fuselage of the aircraft. A plurality of cables 43 connect the canopy 13 to the center of gravity 45 of the fuselage so that when the canopy is ejected from the cradle it will be connected to the fuselage at the center of gravity thereof.

The cylinder 37 and its associated components are generally similar to the cylinder 23 and its associated components.

It will be appreciated that this apparatus may be successfully used on various types of aircraft, such as helicopters and the like.

Figure 5:
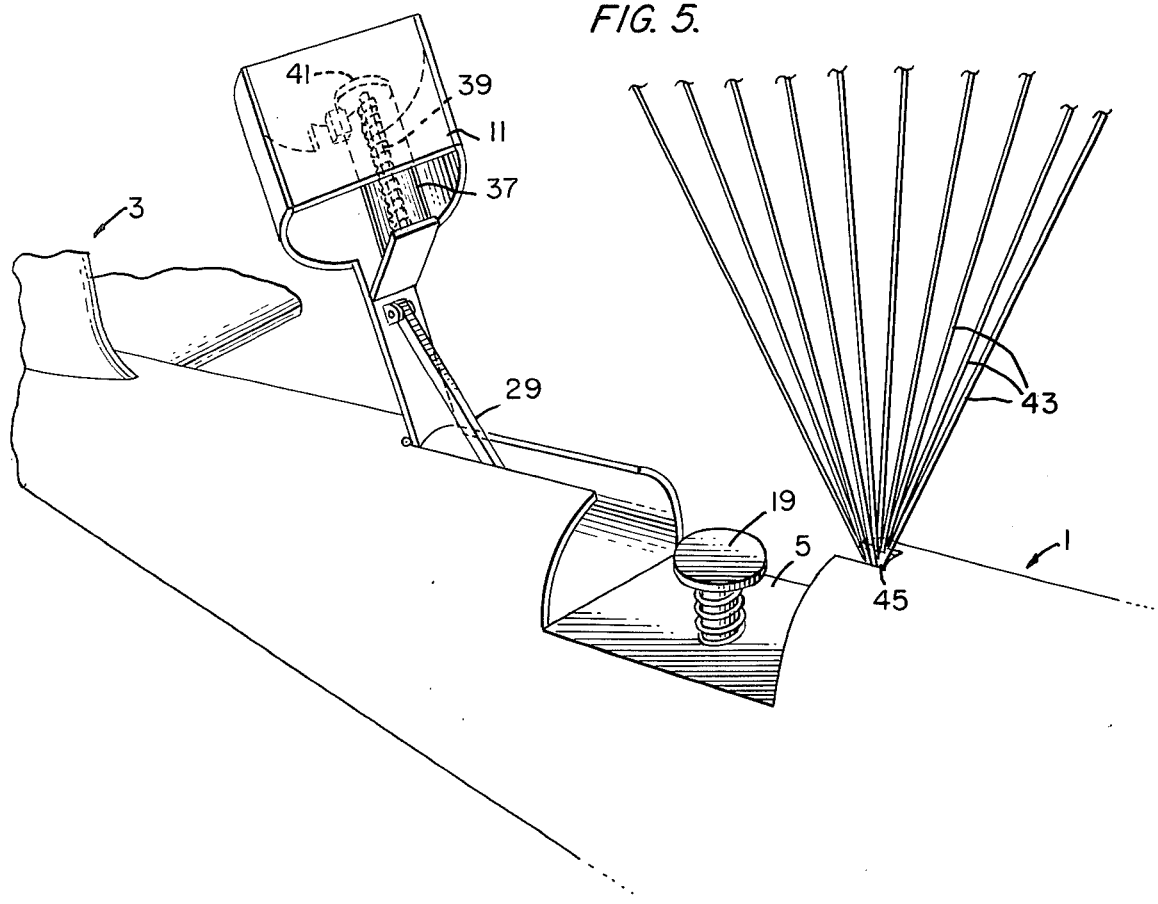
FIG. 5 is a perspective view of the canopy cradle in open position.

When the canopy is stored in the cradle, the cables 43 extend therefrom and are fixed to the center of gravity of the fuselage. Thus, when the canopy is ejected from the cradle, the cables will be positioned as illustrated particularly in FIGS. 1, 2 and 5.

What is claimed is:

1. In an aircraft having a fuselage and including, in combination, a tail assembly, means under the control of the pilot of the aircraft for ejecting a parachute into operative position connected to the fuselage of the aircraft for the safe vertical descent thereof, a cradle for the storage of said parachute, the cradle being open at both ends, and said cradle removably disposed within the fuselage, the parachute being ejectable through one open end of said cradle, said cradle with the contained parachute being movable outwardly from the fuselage under the control of said means and into operative position for ejecting the parachute from said cradle into operative position supporting the fuselage, and the open end of said cradle through which said parachute is ejected when said cradle is in operative parachute ejecting position being in a horizontal plane above the tail assembly of the aircraft, and said fuselage being provided with a well, a closure member therefor openable under the control of said means, and said cradle being fixed to the underside of said closure, the open end of said cradle through which said parachute is ejected being disposed in uppermost position when said closure member is in fully opened parachute ejecting position, and a latching mechanism is provided for maintaining said closure member in well closing position, said latching mechanism being unlatched by said first named means for swinging movement of said closure member to fully open parachute ejecting position and further means extending through said well and in engagement with said cradle and operable by said first named means to provide an upward thrust to said cradle thereby forcing said closure member and the attached cradle into the airstream for moving it to fully open parachute ejecting position, additional means is mounted on said closure member adjacent to the other open end of the cradle and said additional means being caused to operate when said closure member is in open parachute ejecting position, the additional means when operated being in engagement with said parachute and operable to eject said parachute from the cradle.

* * * * *